No. 869,925. PATENTED NOV. 5, 1907.
D. McF. MOORE.
PRESSURE GAGE.
APPLICATION FILED APR. 2, 1906.
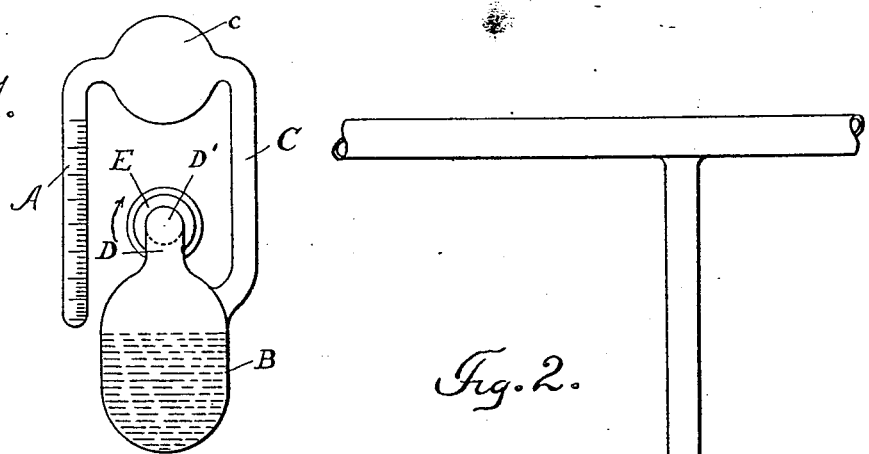
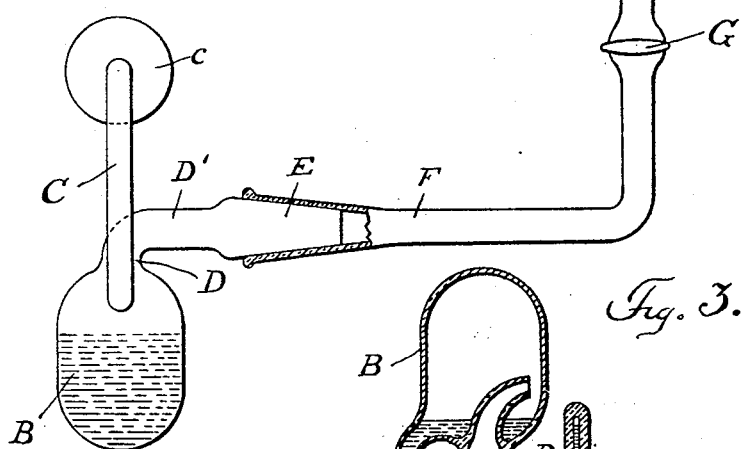
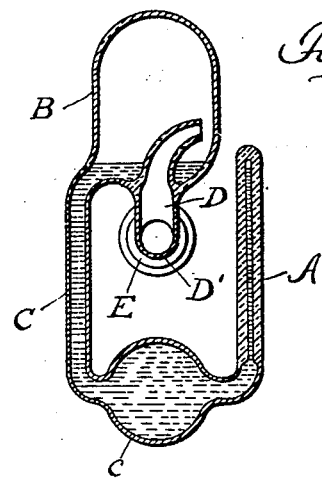
WITNESSES:
INVENTOR
Daniel McFarlan Moore
BY
Townsend & Decker
ATTORNEYS

UNITED STATES PATENT OFFICE.

DANIEL McFARLAN MOORE, OF NEWARK, NEW JERSEY, ASSIGNOR TO MOORE ELECTRICAL COMPANY, OF NEW YORK, N. Y., A CORPORATION OF NEW YORK.

PRESSURE-GAGE.

No. 869,925.  Specification of Letters Patent.  Patented Nov. 5, 1907

Application filed April 2, 1906. Serial No. 309,284.

*To all whom it may concern:*

Be it known that I, DANIEL McFARLAN MOORE, a citizen of the United States, and a resident of Newark, in the county of Essex and State of New Jersey, with post-office address 52 Lawrence street, have invented certain new and useful Improvements in Pressure-Gages, of which the following is a specification.

My invention relates to manometers or devices for measuring the tension of a gas or vapor and more particularly to that species of manometers in which the degree of tension is ascertained by subjecting a given volume of the gas or vapor to compression in a graduated tube of small internal caliber, by means of the weight of a column of mercury or other liquid which imprisons the gas or vapor, the original tension of such gas being measured by the extent of compression which it undergoes under the weight of a given or fixed column of the compressing liquid.

It has heretofore been proposed to construct manometers on this principle, by providing a flexible rubber tube containing mercury and connected at one end to the lower portion of the space in which the compression takes place, the other end of said tube being capable of being raised in order first to entrap a given volume of the gas or vapor by means of the mercury which rises in the space in which connection is made with the vessel containing the gas or vapor whose tension is being measured, and then to compress the entrapped gas or vapor in the gage tube by a column of mercury of definite weight by raising the free end of the flexible tube to a definite height. In this form of manometer as constructed prior to my invention the surface of the mercury in the column contained in the free end of the tube and whose height determines the degree of compression applied to the gas or vapor, is exposed to the pressure of the atmosphere so that, by reason of barometric changes, it is necessary to adjust the instrument for differences of atmospheric pressure upon the top of the mercury column. This form of instrument is moreover cumbersome and the use of flexible or rubber tubing is objectionable owing to the tendency of the same to rot. Moreover, a large amount of mercury is required and there is opportunity for waste through evaporation.

The aim of my invention is to provide a manometer working on the above stated principle without the use of flexible tubing or similar device for raising a body of mercury in one end of a U-shaped tube and also to free the device from the other objectionable features above mentioned.

To this end my invention consists, briefly stated, in the combination with a gage tube, of a bulb or mercury reservoir having a connection to the gage tube leading from the bulb at a point above the normal level of the mercury therein and also provided with means for introducing the gas or vapor whose tension is to be measured, said bulb and tube with their intermediate connections being properly mounted so as to be capable of tilting or rotating on an axis in order to cause the mercury to flow from the bulb and entrap the gas or vapor in the connections leading to the gage tube and to subject the entrapped vapor to the pressure of the column of mercury contained in such connections and caused to flow into the same by the further tilting or turning of the structure and a tubular connection leading from a source of gas or vapor whose tension is to be measured and coinciding with the axis on which the rotation of the structure may take place.

The invention consists further in the details of construction as more particularly hereinafter described and then specified in the claims.

In the accompanying drawings, Figure 1 is a side elevation of a manometer constructed in accordance with my invention. Fig. 2 is an edge view of the same device. Fig. 3 shows the device turned to position for compressing the entrapped gas or vapor.

A indicates the graduated tube in which the compression takes place and which is suitably graduated to enable the original tension of such gas or vapor to be read from the height or extent to which the mercury may enter said tube before the compression balances the compressing mercury column.

I show in the present case a tube graduated to indicate degrees of vacuum or in other words gas or vapor tension below that which will balance a mercury column of the standard height equal to that of the atmosphere, namely 30 inches. As will be readily understood the graduations might be in millimeters or fractions of the height of a column giving a standard pressure equal to that of the atmosphere.

B indicates a glass bulb or chamber containing a body of mercury and connected as shown by a pipe or tube C leading from the chamber B at a point just above the level of the body of mercury contained in B. In the continuation of the tube C is preferably located a bulb or enlargement c, the purpose being to provide a compressing column of mercury whose volume shall be very large as compared with that acting or located in the fine gage tube A so that no re-adjustment of the instrument shall be required or calculations from the readings necessary for differences in the amount of mercury withdrawn from the pressure column by the entrance of the mercury to different heights or positions in the tube A. In the space above the mercury contained in B when the instrument stands in the position shown in Fig. 1, provision is made for introducing the gas or vapor whose tension is to be measured. Preferably such gas or vapor is introduced through a tube D connected to the top of the chamber and joined by an elbow with a pipe or tube D' suitably mounted to afford an axis of rotation in the direction of the arrow, Fig. 1. The tube D' preferably terminates in a stopper E which is ground to fit tightly in the mouth of a tube F, but to be capable of turning in said tube mouth on the axis coincident with the bore or passage through the stopper which passage affords a communication from tube F to the tube D' and bulb B. Tube F is joined to the closed vessel containing the gas or vapor whose tension is to be measured. Interposed in such connections may be a stop-cock G if desired. As will be obvious, the connection to the bulb might be made by disposing the tube D and its continuations in other ways permitting a rotation or tilting of the structure.

The various parts shown are preferably all made of glass. The graduation of the tube A obviously may be ascertained empirically or in other ways known in the art.

I do not limit myself to the exact form of the apparatus or the exact disposition of the parts with reference to one another and to their connections.

In using the instrument same is brought to the position shown in Fig. 1 and connection being made with the vessel containing the gas or vapor whose tension is to be measured, the said gas or vapor enters the tube C bulb c and tube A. On tilting the structure toward the position shown in Fig. 3, the mercury enters the tube C and imprisons the gas or vapor and finally, on continuance of rotation to the position shown in Fig. 3, compresses such imprisoned gas or vapor by a column of mercury whose weight is measured or indicated by the height to which the mercury rises in the gage tube A. On reversing the rotation or tilting, the mercury flows back into bulb B and the apparatus is ready for use in taking another measurement.

What I claim as my invention is:

1. A manometer operating by compressing the gas or vapor whose tension is to be measured and comprising a liquid-containing bulb or chamber, a gage tube connected to said bulb at a point above the normal level of liquid therein, and a tube also connected to said chamber above the normal level of liquid therein and terminating in a tube suitably mounted to afford an axis of rotation whereby on rotation of the bulb on said axis the liquid may flow and entrap the gas or vapor flowing through the axis and tube to the gage tube, as and for the purpose described.

2. A manometer operating by compressing the gas or vapor whose tension is to be measured and comprising a liquid-containing bulb or chamber having an attached gage tube connecting with said bulb above the normal level of the liquid contained therein and a second pipe or tube leading from the chamber at a point above the level of the liquid and joined to an elbow terminating in a pipe or tube suitably mounted to afford an axis of rotation whereby the gas or vapor passing through the elbow to the gage tube by way of the space above the normal level of the liquid may be entrapped by said liquid on rotation around said axis as and for the purpose described.

3. In a manometer the combination with a liquid-containing bulb or chamber, of a tube carried thereby and terminating in a gage tube, a bulb or enlargement in the connection to the gage tube and a tube connecting the bulb with a body of gas or vapor whose tension is to be measured, said latter tube being coincident with the axis of rotation around which the structure may be rotated to entrap the gas or vapor passing through the latter tube and space above the normal level of the liquid in the bulb to the gage tube.

Signed at New York in the county of New York and State of New York this 30th day of March A. D. 1906.

DANIEL McFARLAN MOORE.

Witnesses:
C. F. TISCHNER, Jr.,
LILLIAN BLOND.